United States Patent [19]

Castle

[11] 3,954,681

[45] May 4, 1976

[54] METHOD OF RECLAIMING CURED POLYURETHANE ELASTOMERS

[75] Inventor: Richard M. Castle, West Alexandria, Ohio

[73] Assignee: Whittaker Corporation, Los Angeles, Calif.

[22] Filed: Sept. 23, 1974

[21] Appl. No.: 508,132

Related U.S. Application Data

[63] Continuation of Ser. No. 363,907, May 25, 1973, abandoned.

[52] U.S. Cl. .......................... 260/2.3; 260/29.2 TN; 260/33.4 UR; 260/75 N; 260/77.5 A; 260/77.5 AN
[51] Int. Cl.$^2$ .................... C08J 11/04; C08G 18/82
[58] Field of Search ........... 260/2.3, 77.5 A, 75 NA, 260/77.5 AN

[56] References Cited

UNITED STATES PATENTS 2,494,593    1/1950    Sverdrup............................. 260/2.3

OTHER PUBLICATIONS

Rubber Chemistry & Technology, Vol. 39, No. 4, Part II (1966) pp. 1328-1337, Magnus et al., Stability of Urethane Elastomers in Water, etc.

Rubber Age, Vol. 96, Feb. 1965, pp. 705-712, Athey, R. J., Water Resistance of Liquid Urethane Vulcanizates.

*Primary Examiner*—Wilbert J. Briggs, Sr.
*Attorney, Agent, or Firm*—Donald E. Nist

[57] ABSTRACT

A novel method of reclaiming cured polyurethane elastomers comprises milling particulate cured polyurethane elastomer under shear sufficient to increase the temperature of the elastomer for a time sufficient to form the elastomer into a cohesive mass and then continuing the milling at elevated temperature and pressure in the presence of a selected devulcanizing agent until a uniform, continuous, cohesive, partially devulcanized product is obtained. The novel product has properties which are improved over those of the cured starting material including improved heat resistance, abrasion resistance and tensile strength.

10 Claims, No Drawings

METHOD OF RECLAIMING CURED POLYURETHANE ELASTOMERS

This is a continuation of application Ser. No. 363,907 filed May 25, 1973, and now abandoned.

BACKGROUND

1. Field of the Invention

The present invention generally relates to reclamation of polyurethane elastomers and more particularly to the reclamation of cured polyurethane elastomers to form partially devulcanized elastomeric end products having improved properties.

2. Prior Art

A problem has existed relative to the disposal of scrap cured elastomers. To incinerate elastomers creates an air pollution problem because the combustion process causes toxic gases and photochemical compounds to be released. If, on the other hand, waste disposal is effected by burying the elastomers, not only is considerable expense involved but the buried material does not biodegrade. Moreover, cured elastomers are relatively expensive to produce so that waste disposal thereof constitutes a loss to the economy of potentially valuable material.

Accordingly, various methods have been proposed for the reclamation of different types of cured elastomeric materials. In this regard, it has been proposed to chemically treat elastomeric polyurethanes and the like either to isolate the same from impurities or to decompose the same to obtain reagents which can then be reacted to form useful products. In the former case, cured polyurethanes have been dissolved in various types of materials, such as amines, hexafluoroisopropanol, uncured polyurethanes and the like. In the latter case, polyurethanes have been heated to above their decomposition point to form decomposition liquids capable of reacting with di-isocyanates to produce useful products. As another example, polyurethanes have been heated in selected glycols to decompose the urethanes for isolation of useful reaction agents. As a third example, polyurethanes have been liquified in linear polyesters and polyester-amides in the presence of catalysts to dissociate the polyurethane linkages. Lower alcohol amines have also been used to peptize urethane linkages. Mixtures of amines, alkali metal hydroxides and oxides and the like have also been used for such purposes.

Attempts to recover a devulcanized or partially devulcanized and reusable form of polyurethane while preserving the polyurethane molecules have been largely unsuccessful. In most instances, it has been necessary to combine chemical dissolving or dissociating utilizing expensive, complicated, non-recoverable chemicals, along with physical methods including relatively high temperatures, resulting in degradation of physical characteristics of the products.

Accordingly, there is a need for a simple, inexpensive, rapid, efficient and reproducible method of breaking the cross-linkages of elastomeric cured polyurethanes without adversely affecting the molecular composition of the urethanes so as to provide materials which themselves form useful elastomeric products or which can be easily reacted to form useful materials. Preferably, such a method should not require expensive or complicated chemicals, difficult steps or specialized equipment and should not itself produce large amounts of pollutants.

SUMMARY OF THE INVENTION

The present invention satisfies the foregoing needs. The invention is generally as set forth in the Abstract above. It comprises a method of reclaiming waste polyurethane elastomers in the cured state in such a manner that the elastomers are partially devulcanized to a controlled degree to provide products which exhibit improved physical properties over those of the starting material. The method provides an effective way of eliminating waste disposal and pollution problems. Moreover, the novel products of the method of the present invention exhibit improved processibility, heat resistance, abrasion resistance and tensile strength as compared with the starting materials.

The method of the invention employs inexpensive devulcanizing agents, such as water or aliphatic alcohol or mixtures thereof which can easily be disposed of. The method can be carried out in a reasonable length of time in a few number of steps utilizing conventional rubber processing equipment and is commercially reproducible. The method is applicable to plasticized and unplasticized polyurethane polymers which have been cured by any standard curing method, for example, diamine curing or polyol curing. Moreover, cured polyurethane elastomers of the type which includes polyesters and of the type which includes polyethers can be reclaimed, as well as the type which includes both polyethers and polyesters. Further advantages are set forth in the following detailed description.

DETAILED DESCRIPTION

In accordance with the present invention, a method is provided for reclaiming cured polyurethane elastomers. The method includes milling cured polyurethane elastomer in particulate form under shear. In this regard, the starting material to be reclaimed comprises polyurethane elastomer selected from the group consisting of polyether-polyurethane elastomer, polyester-polyurethane elastomer, modified polyester-polyurethane elastomer, modified polyether-polyurethane elastomer, and mixtures thereof. Such elastomers may be produced by reaction of polyisocyanates with linear polyesters or linear polyethers containing hydroxyl groups. Such starting material has been cured and vulcanized by any conventional procedure, such as the use of sulfur, peroxides, amines and/or polyols, in the presence of absence of acidic or metal-containing catalysts, etc. at about. e.g., 212°F – 250°F to obtain optimum physical properties, including a hardness of between about 10 Shore A and about 90 Shore D. Such starting materials are useful for a variety of purposes and are obtained as scrap from such processes as the manufacture of molded synthetic rubber components and the like.

In order to effectively mill the cured polyurethane elastomer in accordance with the present method, it is highly desirable that the elastomer be in fine particulate form. This is most easily accomplished by soaking the elastomer in a suitable solvent, such as a ketone, for example, methyl ethyl ketone, or a chlorinated solvent, for example, 1-1-1 trichloroethane or a selected acetate, for example, secondary butyl acetate, or other suitable solvent for the cured polyurethane. The soaking operation takes place for a time sufficient to cause the polyurethane to swell at least to a semi-brittle state so that it can be very easily crumbled to fine particle size. The swelling operation takes place, for example, over a period of about 3 to 16 hours or more, usually at ambient temperature. Elevated temperatures accelerate the swelling rate and can be used.

The swelled and semi-brittle material is then removed from the solvent, and crumbled in a mill or the like to the desired particle size, for example, from about 0.01 to about 0.06 inch, and then the solvent is removed from the particles. Any suitable solvent removal method can be employed, for example, tumbling while subjecting the crumbs to a current of hot, dry air to speed the evaporation of the solvent from the crumbs.

It will be understood that, for the purposes of the present invention, any method which comminutes the scrap cured polyurethane to a desired particle size range of between about .0001 inch and about 0.1 inch is suitable to provide a suitable starting material for the milling operation of the present method. Although the particle size range obtained is not critical, particles of .05 or .06 inch are desirable. In any event, the particles should be small enough to permit dispersion thereof and cohesive knitting thereof within a reasonable length of time during treatment in accordance with the method.

In the present method, the particulate cured polyurethane is milled under shear sufficient to generate an elevated temperature, preferably at least about 120°F. and to cause the particles to form a cohesive mass. Temperatures of as high as 160°F. or more generated by friction in the shearing step are suitable. The milling step can be accomplished by, for example, using a conventional rubber mill with the rubber mill rolls traveling in opposite directions and with a gap of usually not more than about 1/16th inch therebetween. A pressure is exerted on the crumbs and shearing of the crumb mass occurs while the mass passes through the gap. Normally, the milling surfaces are warm (about 90°F. – 100°F.). The batch of crumbs is passed through the rolls of the mill repeatedly until the batch is heated through the pressure and shearing effect exerted by the rolls to the above-indicated temperature range. It should be noted, however, that this temperature range is well below the decomposition point for the polyurethane (about 280°F. – 300°F.) and, while it is postulated that devulcanization may begin due to the temperature and shearing occurring in this milling operation, most of the devulcanization occurs in a subsequent step particularly described hereafter.

Normally, when the rubber mill is operated at the usual rates with the space gap called for above between the rolls, knitting of the crumbs together to form a cohesive mass occurs relatively rapidly in, for example, about two minutes or so. The knitted or cohesive mass exhibits some thermoplastic properties but the cohesion thereof is just sufficient to keep the mass together.

When the crumbs have formed into the described cohesive mass, devulcanization is initiated in accordance with the present method. This step is accomplished through the addition of small amounts of liquid devulcanizing agent comprising a suitable aliphatic alcohol or water or a mixture to the cohesive mass in the rubber mill or in a separate apparatus such as a blender capable of exerting pressure on the mass while the mixing of the cohesive mass continues. For example, the mass can be removed from the rubber mill and placed in a standard Banbury Internal Mixing Unit the temperature of which can be controlled by heating the cooling jackets and the like. The mixer is fitted with a ram or other means for exerting pressure on the mass. In the event that the cohesive mass is maintained within the rubber mill, the pressure exerted by the rollers will serve the same purpose.

The devulcanizing agent is added in small amounts as the mixing of the cohesive mass continues. The amount of the devulcanizing agent added to the mass will depend upon the particular devulcanizing agent selected and the operating conditions, as well as the extend of devulcanization which is desired and the nature of the material forming the cohesive mass. Normally, the devulcanizing agent is added to the mass over a period of time, for example, about 7 to 8 cc per minute to about 50 cc per minute, until the amount, in weight, of the devulcanizing agent approximates that of the polyurethane constituting the cohesive mass. However, other suitable addition times can be employed, for example, at 1, 5 and 10 minute intervals, depending on the size of the mass, and other suitable relative concentrations of devulcanizing agents can be used, for example, about 80 cc per pound of polyurethane.

The devulcanizing agent, if an aliphatic alcohol can be, for example, ethyl or methyl or propyl or butyl alcohol or a diol or triol such as ethylene glycol or the like. The pressure exerted on the mass during the addition of the devulcanizing agent while blending or mixing of the devulcanizing agent mass is continued may be any suitable pressure, for example, the pressure exerted by a 20 pound weight in any event is sufficient to assure that the devulcanizing agent intimately contacts the particles of the cohesive mass and that the mass itself under the operating conditions increases in temperature during the devulcanizing step to between about 120°F and 280°F.

The devulcanizing step is continued for a time sufficient to cause the mass to form into a continuous uniform mass showing complete dispersion of the particles, i.e., no discrete particles, and with the cross-linkings between the polyurethane molecules broken to an extent such that the resulting product can be formed into a very thin continuous elastic sheet which may be translucent. The product exhibits high tear strength, tensile strength and abrasion resistance. The time necessary to form the elastomer into the desired partially devulcanized product under the devulcanizing conditions will vary, depending upon the parameters involved, but in a typical example can be accomplished within about 3 – 5 minutes after the first devulcanizing agent addition. It has been found that if the starting material is a cured plasticized polyurethane elastomer, processing time is shorter than in those instances where unplasticized starting materials are used. Usually, in order to accomplish the desired results, a longer length of time or a greater pressure or devulcanizing temperature is used with more of the devulcanizing agent when unplasticized starting materials are employed. If a high shear mixing apparatus is used, such as a Banbury Internal Mixing Unit employing a ram, the dispersion of the cohesive mass particle into the uniform desired product occurs relatively rapidly.

The product is then ready for removal from the mixing operation, that is the devulcanizing step, and can then be utilized for various pruposes. Such product is thermoplastic in this form with a softening point ranging from about 250°F to about 450°F, depending upon the nature of the starting material.

The product obtained by the present method can be used to provide a molding compound. For example, this product can be mixed with a thermosetting or heat fluxing resin such as a vinyl resin or the like. A compatible plasticizer, for example, of the polyester type, can be used to improve the flow characteristics of the mixture. In one typical formulation, the reclaimed product is used in a weight concentration relative to the molding compound comprising the vinyl resin and plasticizer of about 10 – 50 percent. Such a molding compound can be, for example, molded in 5 to 10 minutes at 300°F in a transfer or compression molding apparatus.

A second type of molding compound can be formulated utilizing the reclaimed product. In this regard, the reclaimed product is mixed with dicumyl peroxide curing agent (6.25 parts, of dicumyl peroxide, by weight of the reclaimed material), and molded at 350°F for 15 minutes to form a cured molded shape exhibiting increased tensile strength and is a thermosetting compound.

In a third example of a typical use for the reclaimed product of the present method, such product is removed from the processing mill and without additional curing agents added forms an excellent thermoplastic material which is used in compression and transfer molding operations. A typical relcaimed product of this type has a softening point of about 257°F – 260°F under pressure and is resistant to thermal decomposition at up to about 300°F.

Various types of adhesives can also be formed from the present reclaimed product by dissolving such product in selected aromatic and/or ketone type solvents or the like. The adhesives exhibit high shear strength, high tensile strength and excellent cohesion. Such formulations may also be used as primer coats for bonding agents. In a typical formulation for a vulcanizable primer, 40 parts of the reclaimed product are mixed in a sigma blade type mixer with 40 parts of chlorinated rubber, 20 parts of silica filler and 10 parts of dicumyl peroxide. The material is diluted with acetone and methyl ethyl ketone and is useful in bonding other types of elastomeric compounds to surfaces such as metals, as well as providing a protective coating which can be cured in place to form a rigid resistant surface. As a protective coating, the reclaimed product contributes improved environmental resistance to water, ultraviolet radiation and the like. In place of utilizing the reclaimed material in a solvent, the reclaimed material can be used in thin sheet form or the like to provide a primary protective cover which can be bonded in place with conventional adhesives.

The product of the present method can also be successfully used as an extender or reinforcing agent for various elastomeric compositions. Due to the low cost of the product, it can economically replace conventional fillers while providing substantially improved properties thereover. It can be readily blended with other synthetic elastomers and can contribute increased tear resistance, abrasion resistance, environmental resistance and tensile strength to products incorporating the same. Moreover, it is capable of imparting improved processibility, heat resistance and thermoplastic flow to millable gum urethane compound mixtures and the like. Certain features of the invention are further illustrated by the following specific Examples.

EXAMPLE 1

A castable type urethane polymer of the polyether type commercially available under the registered trademark "Du Pont Adiprene L-100" from the Du Pont de Nemours & Company, Wilmington, Delaware, is used in a reclamation method in accordance with the present invention. This polyurethane is one which has been cured by mixing with methylene bis 2-chloroaniline (95% stoichiometry) and then heating it in a mold for three hours at 212°F. The cast and cured polyurethane elastomer is then removed from the mold and soaked in methyl ethyl ketone for about 8 hours, that is until it swells and becomes semi-brittle and easy to crumble. It is then removed from the methyl ethyl ketone and passed through a high shear rubber mill several times to finely pulverize it. The solvent is then removed from the finely pulverized material by passing hot air therethrough while tumbling the same.

A 1 pound amount of the solvent-free pulverized starting material is then passed through a high shear rubber mill with the mill rollers rotating in opposite directions and with a 1/16 inch gap therebetween. The pulverized material is passed through the gap a sufficient number of times to increase the temperature of the material to about 130°F and to coalesce the material into a loosely cohesive mass.

The cohesive mass is then transferred to a steam jacketed double sigma blade mixer and subjected therein to a temperature of about 220° – 270°F (jacket temperature 220°F – 290°F) while the mass is being mixed in the mixer under compression from a 25 pound gravity fed ram. A total of 20 cc. of water is added to the mass in the mixer. Mixing is continued for 15 minutes until the water is thoroughly dispersed throughout the mass, the particles of the mass have been uniformly dispersed and the mass is formed in to a uniformly subdivided material having elastic properties. This product can be rolled into a very thin translucent sheet exhibiting high tear strength and high tensile strength.

The reclaimed product is then molded, in a compression mold under the following conditions of temperature, pressure and time: T° = 300° – 320°F, Time = 20 – 25 minutes using 30,000 to 40,000 tons pressure. The same size mold (2 inches x6 inches x8 inches ) is employed in a parallel run using the starting material with the curing agent added thereto and the physical characteristics of the reclaimed product, as opposed to the original material, are determined. When a standard ASTM D-76-99 T Hardness-Durometer Shore-A Test is performed, it is determined that both the original polyurethane and the reclaimed polyurethane have 90–91 Shore A hardness.

An ASTM D-104-56 Taber Abrasion Test utilizing a CS-17 Taber Abraser is performed on both molded products, that is, the reclaimed material and the starting material. All test results are expressed in aprasion loss of materials per 1000 cycles – 1000 gram weights. In each instance, six tests are run and the average taken. The reclaimed compound exhibits a (Taber Wear Index) loss of 0.0052 whereas the original compound, that is, the starting material, exhibits a loss of 0.0129, i.e., a substantially greater loss. Accordingly, the improved wear resistance of the reclaimed material is demonstrated.

EXAMPLE II

The method and parameters as set forth in Example I are followed in reclaiming and in comparing the reclaimed product with the starting material. However, in this instance, the starting material is a castable polyether based urethane commercially available under the registered trademark "Du Point Adiprene L-167" from Du Pont de Nemours & Company, Wilmington, Delaware. This polyurethane has been cast and cured for three hours at 212°F after mixing with the curing agent (95% stoichiometry) specified in Example I. The hardness and wear resistance tests are carried out in the manner specified in Example I. The reclaimed product has Shore A hardness of 92–94 while the starting material has Shore A hardness of 95, approximately the same. In contrast thereto, the wear resistance of the reclaimed material is substantially greater than that of the starting material, i.e., 0.0265 as compared with 0.042.

EXAMPLE III

The method of Example I is carried out utilizing the same parameters, except that a castable gum polyester type polyurethane starting material commercially available from Witco Chemical Co., Inc. under the registered trademark "Formrez-P-410" is utilized. This polyurethane has been cast and cured for 16 hours at 212°F after mixing with a curing agent comprising equal parts of the curing agent specified in Example I and 1–4 butanediol (45% stoichiometry for each). The reclaimed product has Shore A hardness of 69–71 while the starting material has Shore A hardness of 70. The reclaimed material has a Taber Wear Index of 0.1062 while the starting material has a Taber Wear Index of 0.0197, demonstrating the improved wear resistance of the reclaimed material.

Parallel tests demonstrate the interchangeability of methyl alcohol, ethyl alcohol, propyl alcohol and water as the devulcanizing agent. Moreover, they demonstrate that any suitable amount of devulcanizing agent, i.e., substantially less than up to substantially more than a weight equal to that of the material being devulcanized, can be used. Further parallel runs demonstrate that the starting material can be ground without embrittling and still obtain the same useful product. When embrittling by swelling in a solvent, acetone and other solvents can be used in addition to methyl ethyl ketone. Coalescing of the finely divided material in the rubber mill can be carried out until the internal temperature of the material is, for example, 160°F or 120°F.

EXAMPLE IV

Castable polyether based polyurethane is cured 16 hours at 212°F after mixing with a curing agent comprising dibutyl gl glycol benzoate and methylene bis 2-chloroaniline (90% stoichiometry). This cured starting material is immersed for 5 hours in methyl ethyl ketone, pulverized on a roll mill, dried until free of solvent and processed at high shear in a rubber mill under conditions as specified in Example I. In this instance, however, devulcanization is effected utilizing ethyl alcohol in place of water for the devulcanizing step which is carried out in the rubber mill after the pulverized mass has formed into a cohesive mass. Moreover, an amount of devulcanizing agent equal in weight to that of the cohesive mass is added slowly thereto over a period of about 10 minutes during mixing.

This partially devulcanized product exhibits tensile strength, tear resistance and the like and is obtained over a 15 minute period during devulcanization. This material is then molded as specified in Example I, except that one portion thereof (Sample B) has a curing agent added thereto before molding. Sample A does not. In this regard, Sample B is mixed with dicumyl peroxide (6.25 parts per 100 parts of the reclaimed product) before curing.

Sample A exhibits a 7.5% abrasion loss while Sample B exhibits a 10% abrasion loss during 1600 revolutions on the Goodyear Angle Abrader over a 20 minute run with a load of about 1000 gm.

Abrasion tests run under identical test conditions, but substituting commercial fresh sulfur cured millable polyurethane (Sample C) and commercial fresh peroxide cured millable polyurethane (Sample D) yield abrasion losses of 18.9% (Sample C) and 16.1% (Sample D), exhibiting the improved wear resistance of the novel product of the present invention.

EXAMPLE V

The method of Example IV is followed, except that the starting material is a castable polyester based polyurethane which has been mixed (100 parts) with 20 parts of triisopropylamine and 40 parts polyester-based plasticizer, cast and cured for 19 hours at 212°F. The reclaimed product has wear resistance exceeding that of the starting material.

EXAMPLE VI

The method of Example IV is followed, except that the starting material is a polyester based millable gum polyurethane which has been mixed with 30 p.H.R. (per hundred rubber) amount of carbon black pigment, 0.5 p.H.R. amount of cadmium stearate and 1.5 p.H.R. amount of sulfur, molded and cured for 30 minutes at 300°F. The resultant reclaimed product utilizing this product has improved wear resistance, tensile strength and processibility over the starting material.

EXAMPLE VII

The method of Example IV is followed, except that the starting material is polyether based millable gum polyurethane which has been mixed with dicumyl peroxide 5 – 10 p.H.R., molded and cured for 10 – 30 minutes at 280°F. The reclaimed product exhibits improved abrasion resistance as compared with the starting material.

The foregoing Examples clearly illustrate the advantages of the present method and the reclaimed product thereof, in terms of improved wear (abrasion) resistance, processibility, tensile strength and other properties, in contrast to the starting material. Moreover, the economic advantages of the present method and the favorable effects on the environment (due to efficient pollution-free elimination of scrap polyurethane) render the method a substantial advance in the art. Further advantages are as set forth in the foregoing.

Various modifications in the present method, its steps and parameters and in the novel product of the method can be made. All such modifications as are within the scope of the appended claims form part of the present invention.

What is claimed is:

1. A method of reclaiming cured polyurethane elastomers, which method comprises milling particulate cured polyurethane elastomer under shear sufficient to increase the temperature of the elastomer and for a time sufficient to form said particulate elastomer into a cohesive mass and mixing said cohesive mass at elevated temperature between about 120°F and 280°F but below the degradation temperature thereof and under superatmospheric pressure with a devulcanizing agent selected from the group consisting of water and aliphatic alcohol and mixtures thereof until a uniform, continuous, cohesive, partially devulcanized substantially undegraded, moldable, thermoplastic polyurethane product, capable of being formed into a product having improved heat resistance, abrasion resistance and tensile strength is obtained.

2. The method of claim 1 wherein said particulate cured elastomer is provided by swelling pieces of cured polyurethane elastomer in a solvent for said elastomer until said pieces are in a semi-brittle swelled state, pulverizing said swelled pieces to a fine particulate form and thereafter removing said solvent from said particulate elastomer.

3. The method of claim 1 wherein said cured polyurethane elastomer starting material is selected from the group consisting of polyether-polyurethane elastomer, polyester-polyurethane elastomer, modified polyester-polyurethane elastomer, modified polyether-polyurethane elastomer, and mixtures thereof.

4. The method of claim 1 wherein said milling under shear increases the temperature of said cured particulate polyurethane elastomer to at least about 120°F.

5. The method of claim 1 wherein said devulcanizing agent is added to said cohesive mass during milling at a controlled slow rate up to a total amount at least about equal on a weight basis to said cohesive mass.

6. The method of claim 2 wherein said solvent comprises a ketone and said swelling is effected over a period of at least about three hours at least about ambient temperature.

7. The method of claim 3 wherein said cured polyurethane elastomer is selected from the group consisting of sulfur cured polyurethane elastomer, peroxide cured polyurethane elastomer, diamine cured polyurethane elastomer, polyol cured polyurethane elastomer, and mixtures thereof.

8. The method of claim 7 wherein said cured polyurethane elastomer contains plasticizer.

9. The method of claim 2 wherein said pulverizing is effected in a rubber mill and wherein said solvent is substantially completely removed from said particulate elastomer in air at elevated temperature.

10. A reclaimed, partially devulcanized thermoplastic polyurethane elastomer prepared from cured polyurethane elastomer by milling the same in fine particulate form under shear at elevated temperature to a cohesive mass and mixing said mass at elevated temperature between about 120°F and 280°F but below the degradation temperature thereof, and superatmospheric pressure with a devulcanizing agent selected from the group consisting of water, aliphatic alcohol and mixtures thereof until a partially devulcanized, uniform, cohesive elastomer is provided which is moldable to a product having improved tensile strength, abrasion resistance and heat resistance, in comparison with the starting material.

* * * * *